US007082366B2

(12) United States Patent
Arakawa

(10) Patent No.: US 7,082,366 B2
(45) Date of Patent: Jul. 25, 2006

(54) COMMUNICATION TERMINAL APPARATUS, CONNECTION CONTROL METHOD FOR THE APPARATUS AND PROGRAM FOR THE METHOD

(75) Inventor: Takeharu Arakawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 305 days.

(21) Appl. No.: 10/656,159

(22) Filed: Sep. 8, 2003

(65) Prior Publication Data

US 2004/0054461 A1 Mar. 18, 2004

(30) Foreign Application Priority Data

Sep. 13, 2002 (JP) .......................... P2002-268371

(51) Int. Cl.
*G01C 21/26* (2006.01)

(52) U.S. Cl. ...................... 701/210; 205/209; 340/993; 340/988; 455/456.1; 455/414.1

(58) Field of Classification Search ................ 701/205, 701/210, 26, 25; 340/995.21, 995.13, 993; 455/456.6, 456.2
See application file for complete search history.

(56) References Cited

U.S. PATENT DOCUMENTS 6,028,553 A 2/2000 Oberstein
6,101,443 A * 8/2000 Kato et al. .................. 701/210
6,107,944 A 8/2000 Behr et al.
6,148,261 A 11/2000 Obradovich et al.
6,169,955 B1 * 1/2001 Fultz .......................... 701/200
6,178,374 B1 * 1/2001 Mohlenkamp et al. ...... 701/117
6,202,024 B1 * 3/2001 Yokoyama et al. ......... 701/207
6,317,685 B1 * 11/2001 Kozak et al. ............... 701/210
6,347,278 B1 * 2/2002 Ito ............................. 701/200
6,470,262 B1 * 10/2002 Kerner et al. ............... 701/117
6,594,580 B1 * 7/2003 Tada et al. .................. 701/211
6,853,915 B1 * 2/2005 Hubschneider et al. ..... 701/209
2004/0010366 A1 * 1/2004 Videtich ..................... 701/210

FOREIGN PATENT DOCUMENTS

DE 100 57 077 A 11/2001
WO WO02/31441 A 4/2002

* cited by examiner

*Primary Examiner*—Thomas G. Black
*Assistant Examiner*—Christine M. Behncke
(74) *Attorney, Agent, or Firm*—Sughrue Mion, PLLC

(57) ABSTRACT

In the case of connecting a line for making connection between communication unit 12 mounted in a vehicle-mounted terminal 10 and center communication unit 21 of an information center 20 and acquiring information accumulated in storage unit 23 of the information center 20, control unit 13 of the vehicle-mounted terminal 10 predicts the necessity for connection between the communication unit 12 and the information center 20 and when it is decided that there is a possibility of the connection and there is the necessity, start processing of line connection to the information center is previously started and information can be immediately sent via a line in which the connection is completed at a point in time of actually sending information from the side of the vehicle-mounted terminal 10 to the side of the information center 20.

7 Claims, 2 Drawing Sheets

COMMUNICATION TERMINAL APPARATUS, CONNECTION CONTROL METHOD FOR THE APPARATUS AND PROGRAM FOR THE METHOD

CROSS REFERENCE OF RELATED APPLICATION

This application is based on and claims priority under 35 U.S.C. §119 with respect to Japanese Patent Application No. 2002-268371 filed on Sep. 13, 2002, the entire content of which is incorporated herein by reference.

BACKGROUND OF THE INVENTION

1. Field of the Invention

The present invention relates to a communication terminal widely adopted in a navigation system mounted in a mobile unit.

2. Description of the Related Art

A car navigation system mounted in a vehicle which is a typical mobile unit is constructed so that a map is displayed on a display unit based on the present position of the vehicle whose position is measured and a mark showing the present position of my vehicle is superimposed and displayed on the map.

In the car navigation system, a position measurement unit is constructed of a GPS (Global Positioning System) receiver and a self-sustaining navigation sensor or the like for calculating the present position from a travel direction and a driving distance of the vehicle.

Also, map information for displaying the map on the display unit, attached information attached to the map information and various functional service are designed to receive supply from an information center existing outside the vehicle using a communication unit mounted in the vehicle.

In a navigation system for acquiring various information or receiving supply of various functional service by adopting a communication terminal in which the communication unit is mounted, it is desirably constructed so that without making a user aware of a connection state of the communication unit, information can be supplied (display, sound output) or operation can be advanced quick responsively.

SUMMARY OF THE INVENTION

In order to solve the object, the invention is characterized in that in a communication terminal apparatus which includes a display unit, a communication unit and a connection control unit for controlling a connection state between the communication unit and an information center, and makes connection to the information center through the communication unit to acquire information from the information center, there is further provided a prediction unit for predicting the necessity for connection between the communication unit and the information center, and the connection control unit starts connection to the information center based on a prediction result of the prediction unit.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

An embodiment according to the invention will be described based on FIG. 1. The embodiment shown herein is an embodiment of the case of adopting a communication terminal of the invention to a navigation system.

Figure 1:
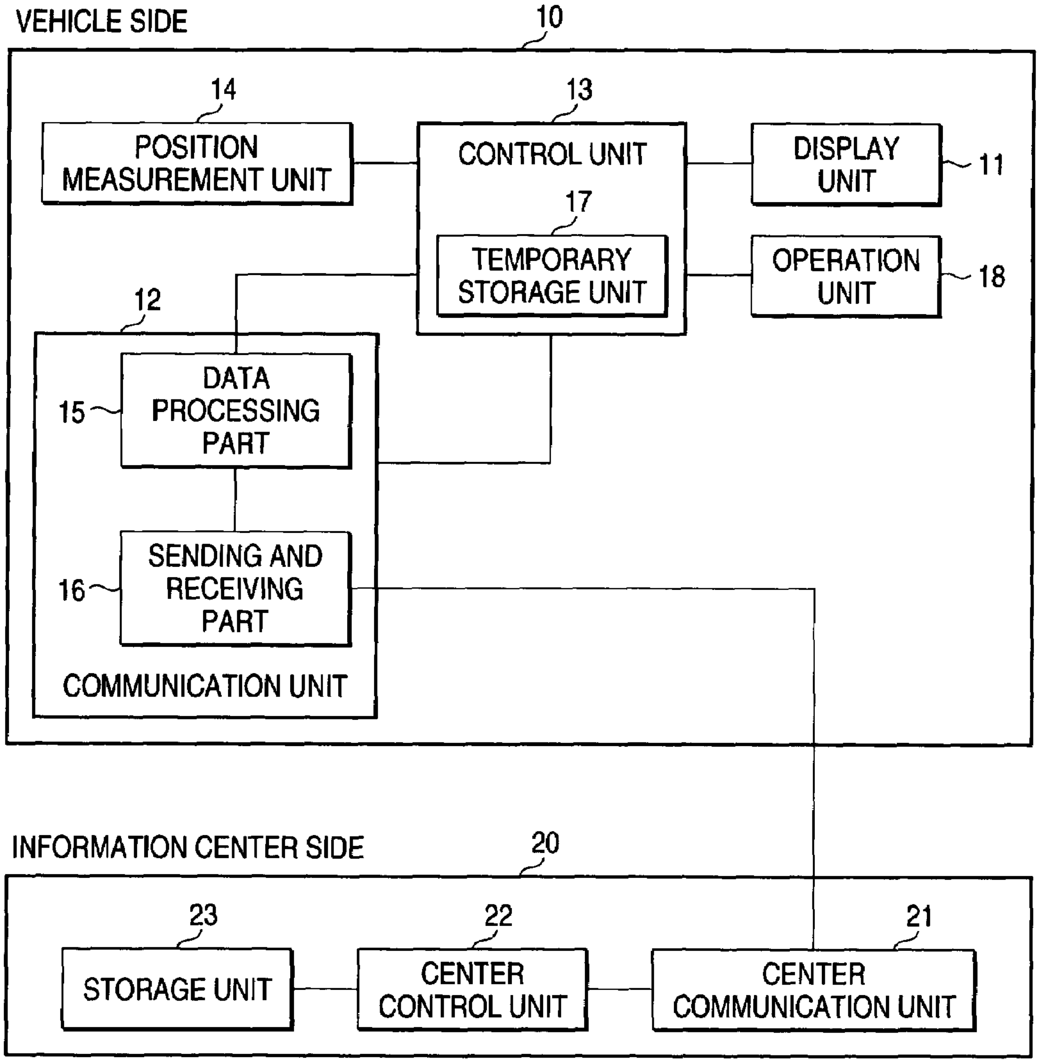
FIG. 1 is a block diagram according to an embodiment of the invention.

In FIG. 1, reference numeral 10 denotes a vehicle-mounted terminal mounted in the side of a vehicle. The vehicle-mounted terminal 10 comprises a display unit 11, a communication unit 12, a control unit 13 for functioning as a display control unit for controlling the display unit 11 and also functioning as a connection control unit for controlling the communication unit 12 and further functioning as prediction means for detecting a driving state of the vehicle to predict the necessity for connection between the communication unit 12 and an information center 20 based on information from each the unit, a position measurement unit 14 for measuring the present position of the vehicle, and an operation unit 18 in which a user inputs various commands. Also, the communication unit 12 comprises a data processing part 15 for performing processing of data to be sent and received, and a sending and receiving part 16 for sending and receiving data.

Reference numeral 20 designates a configuration of the information center side, and the information center 20 comprises a center communication unit 21 for communicating with the communication unit 12 mounted in the vehicle side, a storage unit 23 for being in storage so as to accumulate map information or facility information and further traffic information including traffic jam information, regulation information or accident information about a road, weather information including the present weather or weather forecast of each region, various real time information such as event information occurring in each region at the present point in time or in the future, and a center control unit 22 for functioning as a center communication unit control part for controlling communication by the center communication unit 21 and also functioning as a readout control part for controlling readout of various information from the storage unit 23 and further functioning as a calculation part for calculating a driving route of the vehicle.

As described above, in a navigation system comprising the vehicle-mounted terminal 10 and the information center 20, by way of a line for making connection between the communication unit 12 and the center communication unit 21, various request commands are sent from the vehicle-mounted terminal 10 toward the information center 20 and various information in response to commands is sent from the information center 20 toward the vehicle-mounted terminal 10.

A cellular telephone service system and a PHS telephone service system are available as a mechanism available as this line for making connection between the communication unit 12 and the center communication unit 21. Also, one example of request commands sent from the vehicle-mounted terminal 10 toward the information center 20 includes various information acquisition commands or functional commands mounted in a conventional navigation system, for example, a map request command for acquiring map information, a route calculation request command for calculating a driving route, a retrieval request command for retrieving facilities or points, and an information request command for acquiring various information such as traffic information.

Here, referring specifically to the map request command, the control unit 13 outputs map request information comprising present position information based on the present position of the vehicle measured by the position measurement unit 14 and map scale information to the data processing part 15. After processing of conversion into a predetermined format is performed in the data processing part 15, each the information is sent as the map request command toward the information center 20 through the sending and receiving part 16.

In the information center 20, based on the map request command acquired via the line for making connection between the communication unit 12 and the center communication unit 21, the center control unit 22 reads map information out of the storage unit 23 and this map information read out is sent toward the vehicle-mounted terminal 10 through the line.

Then, in the vehicle-mounted terminal 10, a map is displayed on the display unit 11 based on the map information acquired by the communication unit 12 through the line. Incidentally, the control part 13 is provided with a temporary storage unit 17 for storing information, and it is constructed so that various information including the map information acquired from the information center 20 described below is stored and held unless erasure processing by instructions by a user is actively performed.

Next, referring specifically to the route calculation request command, in the vehicle-mounted terminal 10, plural screens for causing a user to determine a departure place and a destination place are sequentially switched and displayed on the display unit 11 in response to operations of the user under control of the control unit 13.

Then, as a result of operations by the user with a shift in display, a departure place and a destination place and a route place are determined. The control unit 13, based on the each area information, outputs route calculation request command information comprising departure point information, destination point information, route point information and route calculation condition information to the data processing part 15 and after processing of conversion into a predetermined format is performed in the data processing part 15, the information is issued as the route calculation request command toward the information center 20 through the sending and receiving part 16.

In the information center 20, based on the route calculation request command acquired via the line for making connection between the communication unit 12 and the center communication unit 21, the center control unit 22 calculates the optimum driving route from map information read out of the storage unit 23, the departure point information, the destination point information, the route point information and the route calculation condition information. Then, driving route information based on this calculated driving route and map information of surrounding regions including its route are read out of the storage unit 23 and are together sent toward the vehicle-mounted terminal 10 through the line.

Then, in the vehicle-mounted terminal 10, a map on which the driving route is superimposed is displayed on the display unit 11 based on the driving route information and the map information of surrounding regions including its route acquired by the communication unit 12 through the line. Incidentally, this driving route information or the map information of surrounding regions including its route is stored and held in the temporary storage unit 17 inside the control part 13.

Also, as another example of sending the route calculation request command, in case that actual driving of a vehicle deviates from the driving route based on the driving route information acquired as described above, using the present position after the deviation as new departure point information, its departure point information, destination point information, route point information and route calculation condition information are again sent as a route calculation request command.

Further, in case of detecting that driving failure such as a traffic jam or an accident has occurred on the driving route based on the driving route information acquired as described above based on traffic information acquired from the information center 20 separately, a condition of excluding a road on which the driving failure has occurred is newly added as a route calculation condition, and this route calculation condition information, departure point information, destination point information and route point information are again sent as a route calculation request command.

Next, referring specifically to the retrieval request command of facilities or points, in the vehicle-mounted terminal 10, in order to cause a user to input retrieval information as conditions for retrieving the facilities or points to be retrieved, plural screens are sequentially switched and displayed on the display unit 11 in response to operations-of the user under control of the control unit 13.

Then, the control unit 13 outputs the inputted retrieval information to the data processing part 15 and after processing of conversion into a predetermined format is performed in the data processing part 15, the information is sent as the retrieval request command of the facilities or points toward the information center 20 through the sending and receiving part 16.

Typical examples of the retrieval information include an address, a post code, a telephone number, a facility name, a facility kind and so on.

In the information center 20, based on the retrieval request command acquired via the line for making connection between the communication unit 12 and the center communication unit 21, the center control unit 22 reads detailed information about points or facilities matching with the retrieval information included in the retrieval request command and map information including the points or facilities out of the storage unit 23 and these are sent toward the vehicle-mounted terminal 10 through the line.

Then, in the vehicle-mounted terminal 10, the detailed information is displayed on the display unit 11 based on the detailed information about the points or facilities acquired by the communication unit 12 through the line and also in the case of inputting a map display command from a user, a map on which marks showing presence positions of the points or facilities are superimposed is displayed on the display unit 11 based on the map information acquired along with the detailed information about the facilities. Incidentally, this detailed information is also stored and held in the temporary storage unit 17 inside the control part 13.

Next, referring specifically to the information request command, in the vehicle-mounted terminal 10, in order to cause a user to input a kind of information required, plural screens are sequentially switched and displayed on the display unit 11 in response to operations of the user under control of the control unit 13.

Kinds of information include traffic information including traffic jam information, regulation information or accident information about a road and also weather information including the present weather or weather forecast of each region, various event information occurring in each region at the present point in time or in the future.

Then, the control unit 13 outputs information showing an information kind inputted by a user and region information showing a region required (for example, present position information or destination place information and further position information showing a point or a region specified by the user) to the data processing part 15 and after processing of conversion into a predetermined format is performed in the data processing part 15, the information is sent as the information request command toward the information center 20 through the sending and receiving part 16.

In the information center 20, based on the information request command acquired via the line for making connection between the communication unit 12 and the center communication unit 21, the center control unit 22 reads detailed information matching with the information kind and the region information included in the information request command out of the storage unit 23 and these are sent toward the vehicle-mounted terminal 10 through the line.

Then, in the vehicle-mounted terminal 10, the detailed information is displayed on the display unit 11 based on the detailed information acquired by the communication unit 12 through the line and also in the case of inputting a map display command from a user, a map on which marks (a traffic jam mark, an accident mark, a weather mark, an event mark) based on information are superimposed is displayed on the display unit 11 based on map information acquired along with the detailed information about facilities. Incidentally, this detailed information is also stored and held in the temporary storage unit 17 inside the control part 13.

Thus, in the communication terminal apparatus adopted in the navigation system for sending and receiving various commands and various information via the line for making connection between the communication unit 12 and the center communication unit 21, when the control unit 13 for functioning as prediction means for detecting a driving state of the vehicle to predict the necessity for connection between the communication unit 12 and the information center 20 based on present position information or driving direction information from the position measurement unit 14 and further driving route information or traffic jam information which is acquired from the information center 20 and is stored in the temporary storage unit 17 predicts that connection becomes the necessity in a short time, connection to the information center 20 is previously started to be set in a state of connecting a line. That is, when a cellular telephone service system or a PHS telephone service system is used, the vehicle-mounted terminal 10 and the information center 20 are set in a call state.

Then, at a point in time of attempting to send various requests actually toward the information center 20 in the side of the vehicle-mounted terminal 10, the line for making connection between the communication unit 12 and the center communication unit 21 has already been connected, so that each the information from the side of the vehicle-mounted terminal 10 can be sent to the information center 20 at once.

As a result of this, in comparison with a start of line connection after attempting to send each the information for sending in the vehicle-mounted terminal 10, start timing of information sending to the information center 20 can be hastened dramatically and speed of information acquisition from the information center 20 also improves and thus, operation can be advanced quick responsively without making a user aware of a connection state of the communication unit.

EXAMPLE

Next, an example according to the embodiment described above will be described in detail using FIG. 2.

Figure 2:
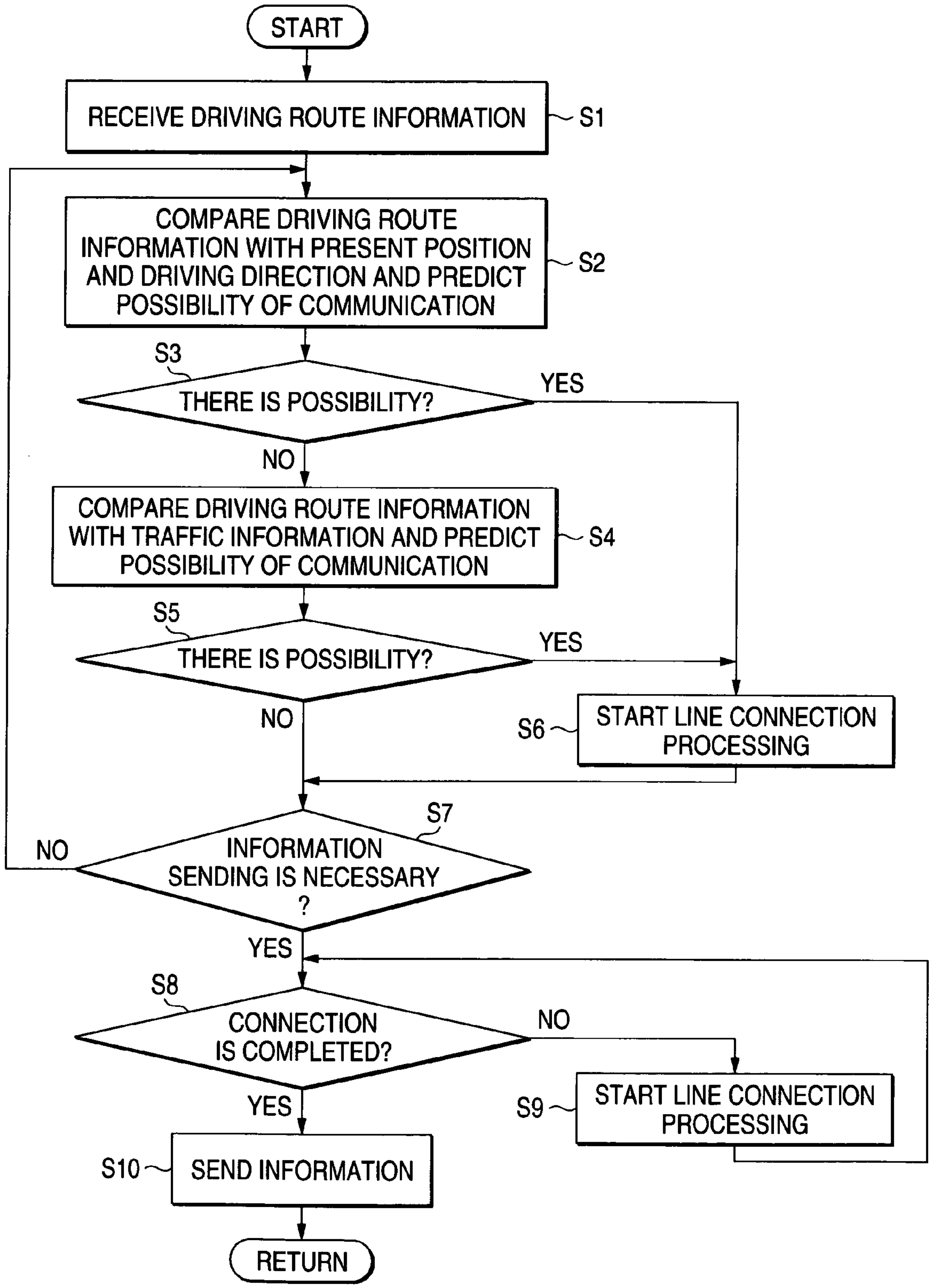
FIG. 2 is a flowchart diagram showing steps of line connection according to an example of the invention.

FIG. 2 is a flowchart showing steps in which the control unit 13 of the vehicle-mounted terminal 10 mounted in the side of a vehicle detects a driving state of the vehicle driving along a driving route and predicts the necessity for connection between the communication unit 12 and the information center 20 and previously starts connection of a line for making connection between the vehicle-mounted terminal 10 and the information center 20.

First, in step S1, driving route information sent from the information center 20 is received and the driving route information is stored in the temporary storage unit 17. Then, route guidance is started based on the driving route information stored. In this route guidance, a map on which a driving route mark (for example, a driving road is colored) based on the driving route information is superimposed is displayed on the display unit 11 and also when a vehicle approaches a fork on a route, a travel direction at its fork is displayed or sound is outputted.

After the route guidance is started, the control unit 13 compares the driving route information with a driving direction and present position information about the vehicle acquired from the position measurement unit 14, and decides whether or not there is a possibility that the vehicle deviates from a driving route shown by the driving route information (step S2). When the vehicle deviates from the driving route, communication with the information center 20 becomes indispensable in order to acquire a new driving route. Therefore, to decide whether or not there is a possibility that the vehicle deviates from the driving route is nothing less than to predict the necessity for line connection to the information center 20.

Subsequently, it is decided whether or not there is the necessity for line connection (step S3) and when there is no necessity, the driving route information is compared with traffic information acquired from the information center 20, and it is detected whether or not driving failure such as a traffic jam or an accident has occurred on the driving route shown by the driving route information (step S4). Here, when the driving failure such as a traffic jam or an accident has occurred on the driving route, communication with the information center 20 becomes indispensable in order to acquire a driving route to which a new condition of excluding a road on which the driving failure has occurred, etc. is added. Therefore, to decide whether or not the driving failure such as a traffic jam or an accident has occurred on the driving route is nothing less than to predict the necessity for line connection to the information center 20.

Subsequently, it is decided whether or not there is the necessity for line connection (step S5). When there is the necessity in this step S5 and the step S3, processing of line connection to the information center 20 is started (step S6).

Subsequently, the flowchart proceeds to step S7 and it is decided whether or not information is actually sent to the information center 20 and when it is decided that sending is unnecessary, the flowchart again proceeds to step S2 and each the processing described above is performed.

On the other hand, when it is decided that sending is necessary in step S7, it is decided whether or not line connection to the information center 20 is completed (step S8). When it is decided that there is the necessity for line connection in step S3 or step S5 and processing of line connection is previously started in step S6 at this time, there is a very high probability of being decided that the line connection is completed and in this case, the flowchart immediately proceeds to step S10 and information is sent toward the information center 20.

On the other hand, when the line connection is not completed yet or the necessity for information sending beyond prediction in step S2 and step S4 arises, the processing of line connection to the information center 20 is continued or newly started (step S9) and the flowchart again proceeds to step S8 and it is decided that the line connection is completed and then information is sent toward the information center 20. (step S10).

Incidentally, the information sent in this step S10 means that it is decided that there is a possibility that the vehicle deviates from a driving route shown by the driving route information in the step S2 and the vehicle actually deviates from the driving route and as a result, using the present position after the deviation as new departure point information, its departure point information, destination point information, route point information and route calculation condition information are again sent as a route calculation request command.

Similarly, it means that when it is detected that driving failure such as a traffic jam or an accident has occurred on the driving route shown by the driving route information in the step S4 and a new route calculation condition of excluding a road on which the driving failure has occurred, etc. is set, this route calculation condition information, departure point information, destination point information and route point information are again sent as a route calculation request command.

As described above, in the present example, rather than timing of sending information actually, the necessity for line connection is decided and when it is predicted that there is the necessity, processing of line connection is started, so that when information is actually sent thereafter, the line connection is completed and an effect capable of immediately sending information toward the information center 20 is shown.

All of the embodiment and the example described above have been described with respect to the communication terminal mounted in the vehicle, but the invention can be applied to a system using a cellular telephone terminal in which position measurement unit is mounted or its terminal apparatus.

In all of the embodiment and the example described above, a computer program can be built to implement a computer as a similar function by its computer program.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication method in a communication terminal apparatus mounted in a mobile unit, the communication terminal apparatus comprising a communication unit, a route information acquiring unit which acquires driving route information based on a driving route calculated by an information center from the information center through the communication unit, and a guiding unit which guides a route based on the driving route information acquired by the acquiring unit, the method comprising:

predicting a possibility for the mobile unit to deviate from the driving route shown by the acquired driving route information, controlling the communication unit to begin establishing a connection to the information center when it is predicted there is a possibility for the mobile unit to deviate from the driving route, and transmitting route calculation request information for calculating a new driving route to the information center only when the mobile unit deviates from the driving route after the establishing of the connection to the information center has begun.

2. A communication terminal apparatus mounted in a mobile unit, comprising:

a communication unit;

a route information acquiring unit which acquires driving route information based on a driving route calculated by an information center from the information center through the communication unit;

a guiding unit which guides a route based on the driving route information acquired by the acquiring unit;

a prediction unit which predicts a possibility for the mobile unit to deviate from the driving route shown by the acquired driving route information;

a connection control unit which controls the communication unit to begin establishing a connection to the information center when it is predicted there is a possibility for the mobile unit to deviate from the driving route; and a transmitting unit which transmits route calculation request information for calculating a new driving route to the information center only when the mobile unit deviates from the driving route after the establishment of the connection to the information center has begun.

3. A communication terminal apparatus as defined in claim 2, wherein the prediction unit detects a driving state of the mobile unit to decide whether or not there is a possibility that the mobile unit deviates from a driving scheduled route.

4. A communication terminal apparatus as defined in claim 3, wherein detection of a driving state of the mobile unit by the prediction unit is a comparison of a driving position and a driving direction of the mobile unit with a driving route shown by driving route information.

5. A communication terminal apparatus as defined in claim 3, further comprising a traffic information acquiring unit which acquires traffic information, and wherein detection of a driving state of a mobile unit by the prediction unit is a comparison of the acquired traffic information with a driving route shown by the driving route information.

6. A communication terminal apparatus as defined claim 2, wherein the route calculation request information for calculating a new driving route includes information of a present position after the mobile unit deviates.

7. A computer program embodied on a computer readable medium and executable on a computer, for causing the computer to function as a mobile unit mounted communication terminal apparatus including:

a communication unit, a route information acquiring unit which acquires driving route information based on a driving route calculated by an information center from the information center through the communication unit, a guiding unit which guides a route based on the driving route information acquired by the acquiring unit, a prediction unit which predicts a possibility for the mobile unit to deviate from the driving route shown by the acquired driving route information, a connection control unit which controls the communication unit to begin establishing a connection to the information center when it is predicted there is a possibility for the mobile unit to deviate from the driving route, and a transmitting unit which transmits route calculation request information for calculating a new driving route to the information center only when the mobile unit deviates from the driving route after the establishment of the connection to the information center has begun.

* * * * *